United States Patent
Marzean et al.

(10) Patent No.: US 7,623,612 B2
(45) Date of Patent: Nov. 24, 2009

(54) BI-ALLOY SPACER GRID AND ASSOCIATED METHODS

(75) Inventors: Michael A. Marzean, Columbia, SC (US); Quang M. Nguyen, Export, PA (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 11/389,793

(22) Filed: Mar. 27, 2006

(65) Prior Publication Data

US 2007/0223646 A1    Sep. 27, 2007

(51) Int. Cl.
    *G21C 3/34* (2006.01)
(52) U.S. Cl. .............. 376/441; 376/438; 376/442; 376/443; 376/439; 376/462
(58) Field of Classification Search ............ 376/441, 376/438, 442, 443, 439, 462
    See application file for complete search history.

(56) References Cited

U.S. PATENT DOCUMENTS

| | | | | |
|---|---|---|---|---|
| 4,224,107 A * | 9/1980 | Delafosse et al. | ............ | 376/462 |
| 4,325,786 A | 4/1982 | Wohlsen | | |
| 4,364,902 A * | 12/1982 | Feutrel | ............ | 376/441 |
| 4,474,730 A * | 10/1984 | Hellman et al. | ............ | 376/462 |
| 4,578,240 A * | 3/1986 | Cadwell | ............ | 376/441 |
| 4,678,632 A * | 7/1987 | Ferrari | ............ | 376/462 |
| 4,695,426 A * | 9/1987 | Nylund | ............ | 376/441 |
| 4,702,881 A | 10/1987 | Weiland et al. | | |
| 4,717,427 A * | 1/1988 | Morel et al. | ............ | 148/672 |
| 4,839,136 A * | 6/1989 | DeMario et al. | ............ | 376/462 |
| 5,024,426 A * | 6/1991 | Busch et al. | ............ | 267/158 |
| 5,223,211 A * | 6/1993 | Inagaki et al. | ............ | 376/462 |
| 6,144,716 A | 11/2000 | Nguyen et al. | | |
| 6,278,759 B1 * | 8/2001 | Yoon et al. | ............ | 376/462 |
| 6,421,407 B1 * | 7/2002 | Kang et al. | ............ | 376/439 |
| 6,542,567 B1 * | 4/2003 | Mayet et al. | ............ | 376/442 |
| 6,807,246 B1 * | 10/2004 | Kim et al. | ............ | 376/438 |
| 6,819,733 B2 | 11/2004 | Broders et al. | | |

FOREIGN PATENT DOCUMENTS

| | | |
|---|---|---|
| EP | 0578502 | 1/1994 |
| EP | 0751530 | 1/1997 |
| WO | WO02072902 | 9/2002 |

OTHER PUBLICATIONS

European Search Report issued in Application No. EP 07 00 5107.
K.-J. Park et al., "Design of a Spacer Grid Using Axiomatic Design," Journal of Nuclear Science and Technology, Dec. 2003, p. 989-997, vol. 40, No. 12.

* cited by examiner

*Primary Examiner*—Rick Palabrica

(57) ABSTRACT

A bi-alloy spacer grid (BASG) is provided with grid straps and springs made using different zirconium alloys. The grid straps are made from a relatively low growth zirconium alloy, and the springs are made from a relatively high growth zirconium alloy. The springs are coupled to the grid straps by welding, mechanical interference, or secondary forming in place. When subjected to irradiation, the springs grow relative to the grid straps thereby maintaining contact with the fuel rod cladding, while the grid straps resist growth to maintain structural stability of the entire fuel assembly. The optimized balance of the high growth springs and low growth grid straps mitigates the formation of gaps between the fuel rods and grid support structures). The growth properties of the grid straps and springs may be further controlled through optional different fabrication processes.

14 Claims, 4 Drawing Sheets

BI-ALLOY SPACER GRID AND ASSOCIATED METHODS

FIELD OF THE INVENTION

The present invention relates generally to nuclear fuel assemblies and, more particularly, bi-alloy spacer grids for nuclear fuel assemblies which resist grid-to-rod fretting and associated methods.

BACKGROUND INFORMATION

To maximize neutron economy, spacer grids for nuclear fuel assemblies are preferably made from zirconium alloy. Zirconium alloy, however, tends to grow during normal operation of the fuel assembly due to the effects of irradiation and hydrogen absorption. The direction and amount of growth depends on several factors including the cold work, alloy, and texture of the zirconium alloy. A strip of zirconium alloy will tend to grow in the direction of rolling as opposed to the direction of the mill roller axis.

Since grid straps are typically rolled along their longitudinal axis, growth will occur in a "lateral" direction, which is perpendicular to the longitudinal axes of the fuel rods that are supported within the spacer grid cells. This growth contributes to the formation of gaps or empty space between the clad support structures (the springs and dimples) and the cladding. Fuel rod clad creep down, which occurs when the cladding collapses inward on the fuel pellets, and loss of pre-load due to annealing of the zirconium alloy, may also contribute to the formation of gaps. Gapped cells lead to a phenomenon known as grid-to-rod fretting, which occurs when flow around the fuel rods induces vibration, causing the cladding to wear against the clad support structures of the spacer grid. Grid-to-rod fretting may have a detrimental effect on the fuel design's capability to withstand loads, particularly Condition III and IV loads.

One way to mitigate gap formation is to design a spacer grid that includes relatively high growth springs and relatively low growth grid straps. High growth springs will tend to maintain contact with the fuel rod cladding while low growth grid straps will tend to maintain structural stability of the fuel assembly. Several approaches have been developed to achieve such a spacer grid design. In one approach, the spring is stamped from the grid strap material, and greater cold work is imparted to the spring rather than the grid strap. In theory, this approach should result in the spring growing at a faster rate than the grid strap. However, post-irradiation examination (PIE) data has proven otherwise. Another approach to mitigating gap formation involves minimizing the growth of the entire spacer grid (including both the grid straps and the clad support structures) via alloy and strap processing changes. However, this approach is not ideal because it is difficult to achieve the appropriate balance between grid strap and spring growth. A further approach to mitigating grid formation involves a "bi-metallic" grid design in which spring clips made from stainless steel or a nickel-chromium-iron alloy (e.g., Inconel®) are attached to zirconium alloy grid straps. However, this approach is not ideal because steel and nickel-chromium-iron alloys are high parasitic loss materials that tend to absorb neutrons, and it is difficult to ensure the mechanical integrity of the attachment between the two dissimilar metals. Yet another approach to mitigating gap formation involves rolling the grid strap perpendicular to its longitudinal axis (the lateral direction) such that the high growth direction is axially aligned with the longitudinal axes of the fuel rods. The springs are then formed by transverse stamping the grid strap along the direction of growth, parallel to the fuel rods. This approach, however, is not ideal because it is difficult to roll the grid straps in this direction. Also, because the spring growth is proportionally reduced along with that of the base strap, the desired relative growth is not improved over designs stamped in the longitudinal direction.

Thus, there exists a need for a more effective way of mitigating the formation of gaps between fuel rod cladding and clad support structures on a fuel assembly spacer grid.

SUMMARY OF THE INVENTION

The present invention meets this need and others by providing a bi-alloy spacer grid (BASG) in which the grid straps and springs are made using different zirconium alloys to mitigate the formation of gaps between the fuel rods and grid support structures (i.e., the springs and dimples). The grid straps are made from a relatively low growth zirconium alloy, and the springs are made from a relatively high growth zirconium alloy. The springs are attached to the grid straps by welding, mechanical interference, or secondary forming in place. When subjected to irradiation the springs tend to grow relative to the grid straps to maintain contact with the fuel rod cladding, while the grid straps tend to resist growth to maintain the structural stability of the entire fuel assembly. The combination of the high growth springs and low growth grid straps mitigates grid-to-fuel rod gaps. The grid straps and springs may be subjected to different fabrication processes (e.g., without limitation, texture and cold work direction) to further affect their growth properties, as desired.

One aspect of the present invention is to provide a grid strap for use with a nuclear fuel assembly spacer grid. The grid strap comprises: at least one dimple; and at least one spring coupled to the grid strap proximate the at least one dimple, wherein the grid strap is formed from a relatively low growth zirconium alloy, and wherein the at least one spring made from a relatively high growth zirconium alloy.

Another aspect of the present invention is to provide a bi-alloy spacer grid for a nuclear fuel assembly having a plurality of fuel elements. The bi-alloy spacer grid comprises: a plurality of grid straps interlocking with respect to one another in a spaced, generally perpendicular configuration in order to form a number of compartments. Each of the grid straps comprises: a plurality of dimples, and a plurality of springs coupled to the grid strap proximate the dimples, wherein the grid strap is formed from a relatively low growth zirconium alloy, and wherein each of the springs is formed from a high growth zirconium alloy.

A further aspect of the present invention is to provide a method of forming a bi-alloy spacer grid. The method comprises the steps of: forming a plurality of grid straps from a relatively low growth zirconium alloy; forming a plurality of dimples onto each grid strap; interlocking the grid straps to create a spacer grid having a plurality of compartments structured to receive fuel elements therein, the dimples securing the fuel elements within the compartments; forming a plurality of springs from a relatively high growth zirconium alloy; and coupling the springs onto the grid straps in order to bias the fuel elements, thereby further securing the fuel elements within the compartments.

It is an object of the present invention to provide a bi-alloy spacer grid that resists the formation of gaps or empty spaces between the clad support structures (springs and dimples) and the fuel rod cladding.

It is another object of the present invention to provide a bi-alloy spacer grid that resists grid-to-rod fretting.

It is a further object of the present invention to offer more design flexibility by providing a bi-alloy spacer grid with separate grid strap and spring components.

It is another object of the present invention to provide a bi-alloy spacer grid that avoids the use of high parasitic loss materials.

It is a further object of the present invention to provide a novel method of forming a bi-alloy spacer grid.

It is another object of the present invention to provide a bi-alloy spacer grid in which the springs for each grid strap are provided in a ribbon-like strip that spans the full length of the grid strap.

These and other objects of the present invention will become more readily apparent from the following detailed description and appended claims.

DETAILED DESCRIPTION OF THE PREFERRED EMBODIMENTS

Figure 1:
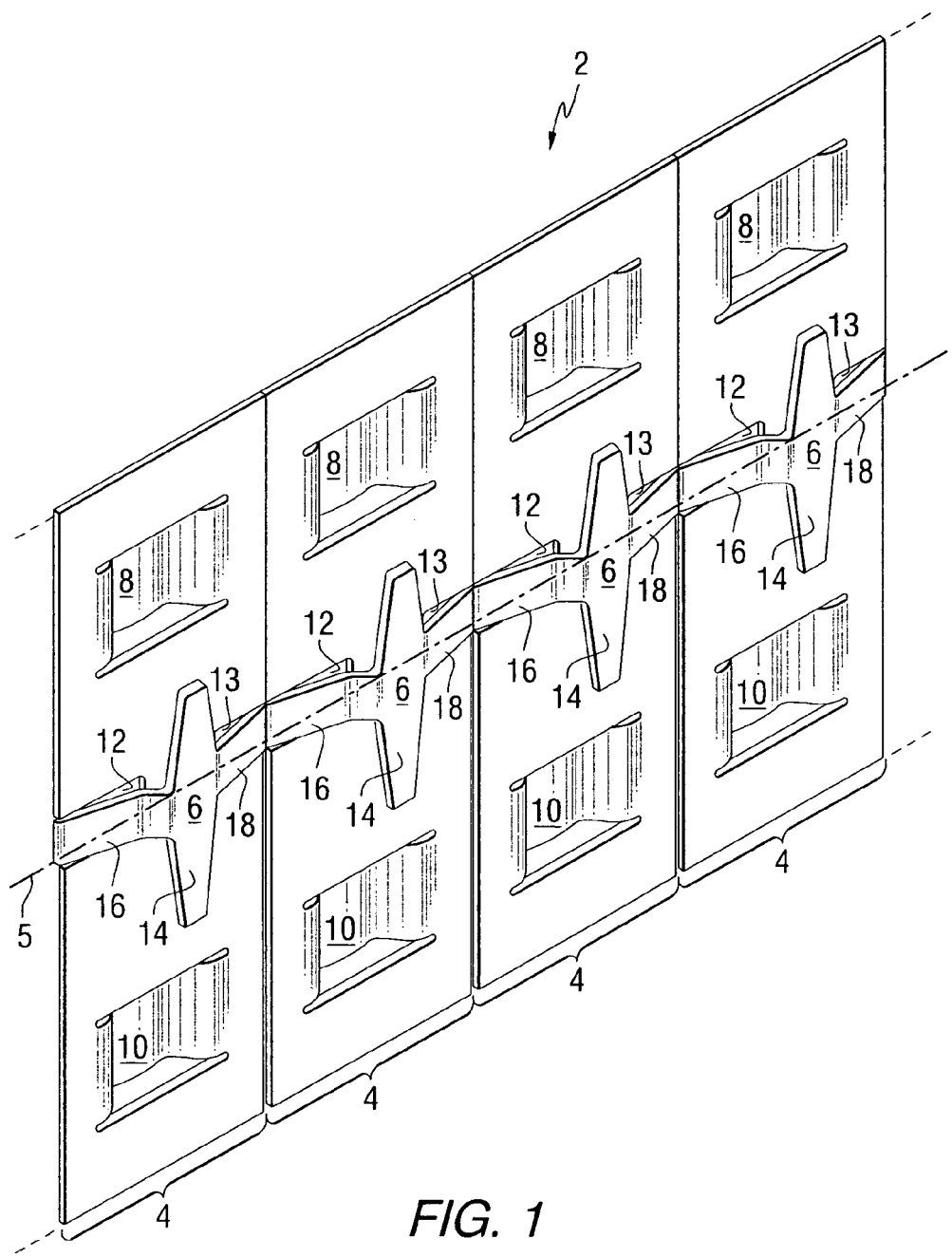
FIG. 1 is a front perspective view of a portion of a grid strap in accordance with an embodiment of the present invention.

The present invention provides a bi-alloy spacer grid (BASG) in which the grid straps and springs are made using different zirconium alloys to mitigate the formation of gaps between the fuel rods and grid support structures (i.e., the springs and dimples). The grid straps are made from a relatively low growth zirconium alloy, and the springs are made from a relatively high growth zirconium alloy. As used herein, the phrase "relatively low growth" refers to a material property wherein when subjected to irradiation, the material exhibits relatively little growth (i.e., thermal expansion). Conversely, as used herein, a material having a "relatively high growth," when subject to the same level of irradiation experiences significantly more growth than the low growth material. The springs are coupled to the grid straps by welding, mechanical interference, or secondary forming in place (e.g., without limitation, stamping). As employed herein, the statement that two or more parts are "coupled" together shall mean that the parts are joined together either directly or joined through one or more intermediate parts. When subjected to irradiation, the springs tend to grow relative to the grid straps to maintain contact with the fuel rod cladding, while the grid straps tend to resist growth to maintain the structural stability of the entire fuel assembly. In this manner, the combination of the high growth springs and low growth grid straps, in accordance with the invention, mitigates grid-to-fuel rod gaps. The growth properties of the grid straps and springs can be further controlled, as desired, by subjecting the grid straps and springs to different fabrication processes (e.g., without limitation, texture and cold work direction).

One of the major complications in spacer grid fabrication is the occurrence of cracks on the springs and dimples when they are formed by stamping the grid strap base material. The present invention alleviates the occurrence of cracks by providing the grid straps and springs as separate components that are independently fabricated and later attached together.

Moreover, because the grid straps and springs are provided as separate components, they allow for a higher degree of design flexibility. For example and without limitation, the grid straps and springs can be designed to have different material thicknesses, which will minimize pressure drop across the spacer grid. In addition, the springs and dimples can be designed with a larger contact surface area to assist in mitigating gap formation, and the larger contact surface area can be achieved without increasing the overall grid strap height and without significantly increasing the pressure drop across the spacer grid. Furthermore, the use of a zirconium alloy for the spring circumvents the need to use a high parasitic loss material, such as, for example, stainless steel or a nickel-chromium-iron alloy.

The grid strap can be made from any known or suitable zirconium alloy that is formulated or optimized for relatively low growth, expressly including, but not limited to, Zirloy M5, -OPTIN, and ZIRLO™. The springs can be made from any known or suitable zirconium alloy that is formulated or optimized for relatively high growth, expressly including but not limited to, Zircaloy 4. In a preferred embodiment, the grip straps are fabricated and processed to minimize lateral growth, i.e., growth in a direction perpendicular to the longitudinal axes of the fuel rods that are supported within the spacer grid cells. This is to address that fact that if the spacer grid grows laterally, the individual grid cells will become larger, thus growing away from the fuel rods and contributing to grid-to-rod gaps. In another preferred embodiment, the grid straps are processed to minimize growth in the direction perpendicular to the rolling direction and punched transversely, and subjected to stress relief anneal, commonly referred to as "heat treatment," after forming. The springs are preferably fabricated and processed to maximize growth perpendicular to the lateral direction. In other words, growth is maximized along the springs' longitudinal axes which are defined by the line extending between the end points of the spring (i.e., to points where the spring is coupled to the grid strap). For clarification of this point, a longitudinal axis 5 has been drawn through the end points of springs 6 in FIG. 1, which is described hereinbelow. It will, however, be appreciated that the invention is not limited to any particular fabrication or treatment processes for the grid strap or springs and, therefore, that any known or suitable alternative processes could be employed.

FIG. 1 shows a front perspective view of a portion of a grid strap 2 in accordance with the invention. The grid strap 2 contains a series of cells 4, and each cell 4 includes a spring 6, an upper dimple 8, and a lower dimple 10. The grid strap 2 is formed from a relatively low growth zirconium alloy. In the example of FIG. 1, the grid strap 2 is transverse stamped from the zirconium alloy. It is then annealed to reduce most residual stresses, thereby reducing the potential for lateral growth. Full anneal is not acceptable in most grid strap designs because thermal relaxation leads to insufficient preload in early life. The springs 6 are formed separately from the grid strap 2 using a relatively high growth zirconium alloy. When the springs 6 are attached to the grid strap 2, the differential growth between the springs 6 and the grid strap 2 will be significantly higher than is possible using a design where the springs 6 and the grid strap 2 are provided from a single piece of material. In a preferred embodiment, the springs 6 may be imparted with a high level of cold work or rolling, and they are not annealed after forming. The springs 6 are preferably rolled along their longitudinal axes.

The springs 6 may have any suitable shape, size, or design. Although the present invention is not limited to any particular spring design, it is preferable for each spring 6 to have a large surface area for contacting the fuel rod cladding, which helps to minimize the wear on the fuel rod cladding if a gap does occur. With a larger contact area, more controlling force can be applied without increasing the force per area. For example, FIG. 1 depicts a preferred embodiment in which each spring 6 has an elongated contact surface 14 that is aligned with the longitudinal axes of the fuel rods. The elongated contact surface 14 may be attached to the grid strap 2 using lateral extensions 16, 18. In a preferred embodiment, the elongated contact surface 14 may have a length ranging between about 0.040 inches and about 1 inch, although the invention is not limited to any particular size, shape, or design for the elongated contact surface 14.

In the example of FIG. 1, the grid strap 2 has been stamped to provide one or more clearances 12, 13 over which the springs 6 are attached. One function of the clearances 12, 13 is to minimize any pressure drop created by the springs 6, as much as possible. It will be appreciated that the clearances 12, 13 may have any suitable shape, size, or design. It will also be appreciated that any known or suitable means may be employed to join the springs 6 to the grid strap 2. For example, each spring 6 may be attached to the grid strap 2 by welding. Alternatively, each spring 6 could be created on the grid strap 2 by secondary forming in place, for example, by providing a tab that is attached to the grid strap 2 then bent over to form the spring once the spacer grid is assembled. Alternatively, each spring 6 could be coupled to the grid strap 2 by a mechanical interference technique which is described in more detail below.

The upper and lower dimples 8, 10 may be formed as integral components of the grid strap 2 by stamping the grid strap 2 material. Thus, the dimples 8, 10 will be made from the same low growth zirconium alloy as the grid strap 2. The dimples 8, 10 may have any suitable shape, size, or design. Each cell 4 may contain any number of dimples desired. Accordingly, it will be appreciated that the invention is not limited to two dimples 8, or ten per cell 4, as shown. In a preferred embodiment, the dimples 8, 10 have a large surface area for contacting the fuel rod cladding (best shown in FIG. 4), which helps to minimize the occurrence of gaps and fretting.

Figure 2:
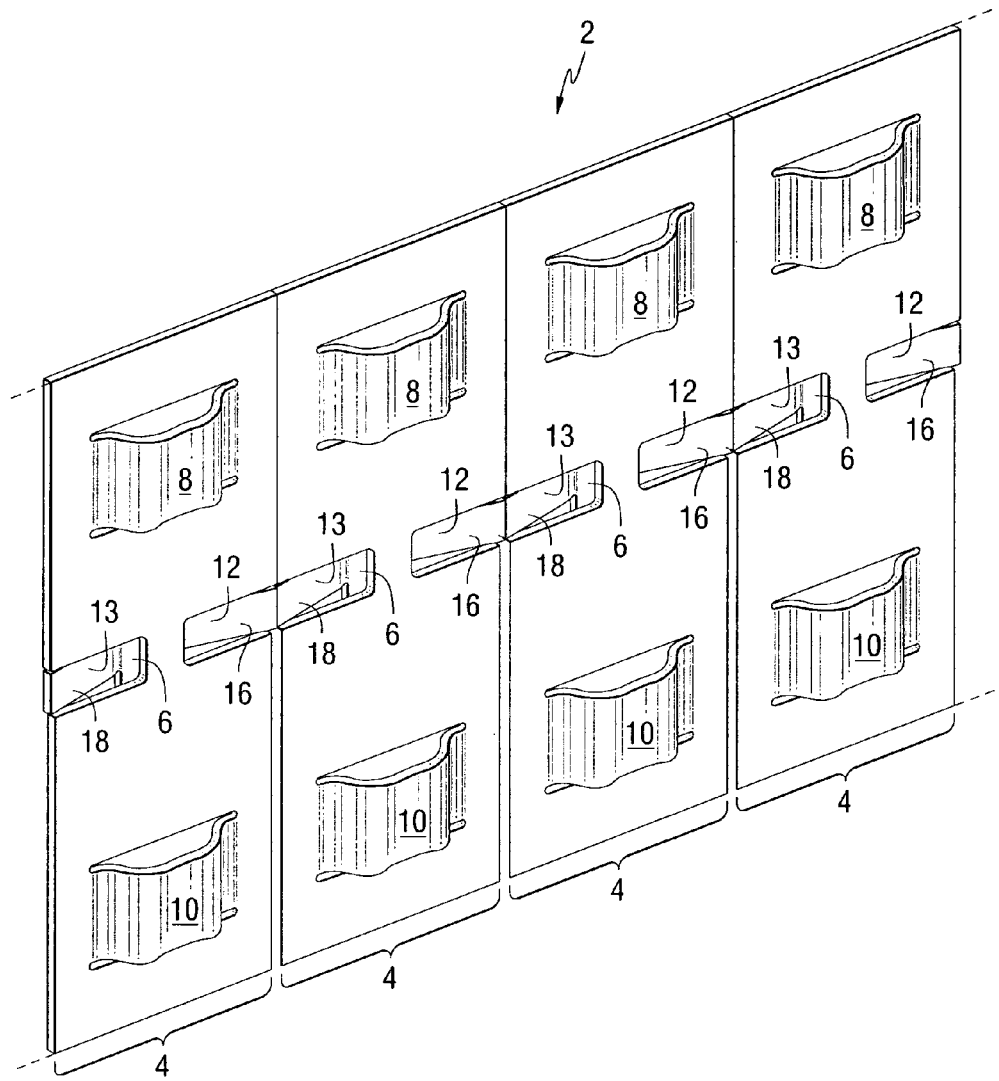
FIG. 2 is a rear perspective view of a portion of a grid strap in accordance with an embodiment of the present invention.

FIG. 2 presents a rear perspective view of the same portion of grid strap 2 that is shown in FIG. 1. The grid strap 2 contains the series of cells 4, each cell 4 including the spring 6, the upper dimple 8, and the lower dimple 10, as previously discussed. Also, as previously noted, the grid strap 2 in the example of FIGS. 1 and 2 is stamped to provide one or more clearances 12, 13 over which the springs 6 are attached. In the example shown, each spring 6 is coupled to the grid strap 2 by welding, although any known or suitable alternative coupling means (e.g., without limitation, secondary forming and interference fit) could be employed.

Figure 3:
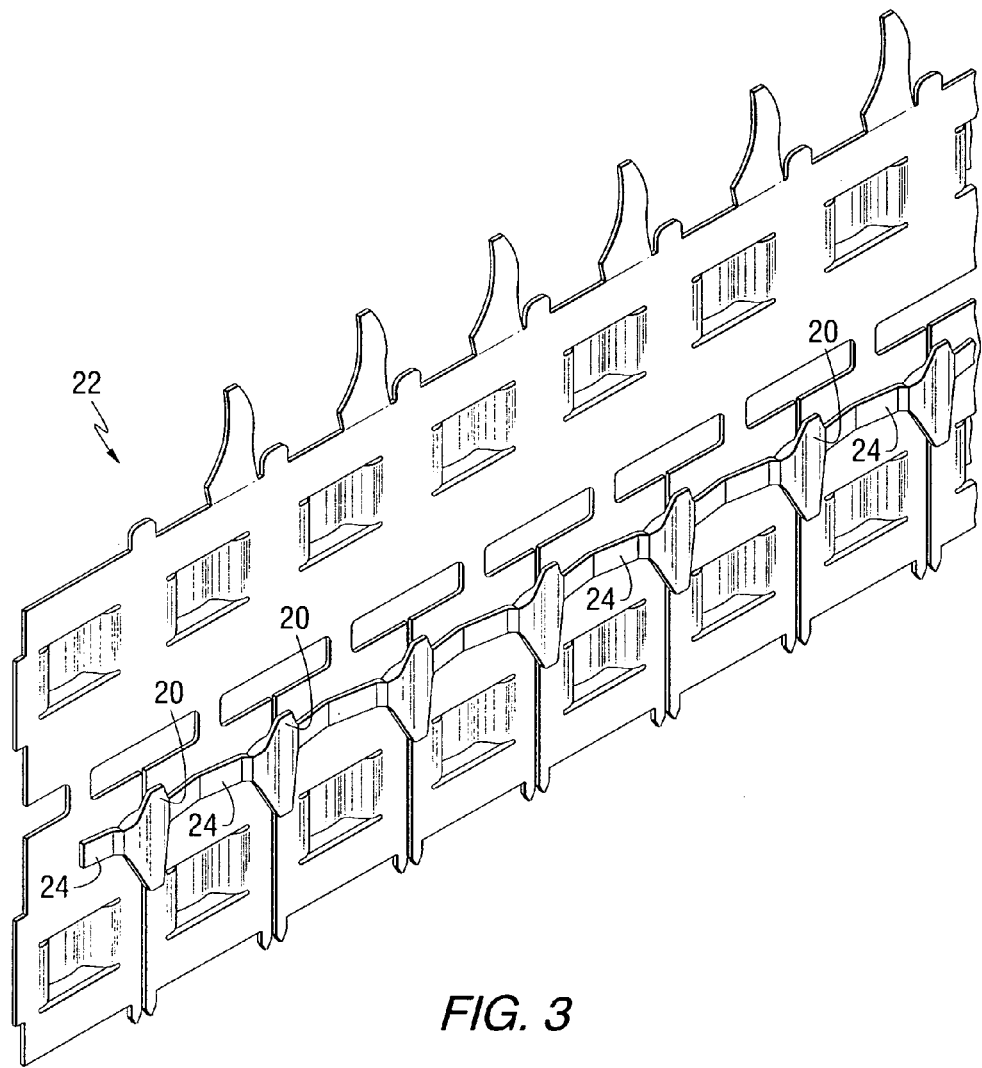
FIG. 3 is a front perspective view of a spring strip for attachment to a grid strap via mechanical interference in accordance with an embodiment of the present invention.

FIG. 3 shows a front perspective view of an embodiment in accordance with the invention, wherein the springs 20 are attached to the grid strap 22 using a mechanical interference technique. Specifically, the springs 20 for each grid strap 22 are provided in a ribbon-like strip 24. Although the strip 24 is not limited to any particular size, shape, or design, it preferably spans the length of the grid strap 22. When the grid strap 22 is interlocked with additional perpendicular grid straps, the strip 24 becomes anchored and the springs 20 are secured into place. Thus, the strip 24 allows the springs 20 to be mechanically captured between interlocking grid straps 22. The strip 24 may optionally be further secured into place using spot welding, forming in place, or a combination thereof. In a preferred embodiment, multiple grid straps 22 are assembled together to form a spacer grid before the strip 24 is welded onto the grid strap 22, and although the strip may be welded, welding is not a requirement.

Figure 4:
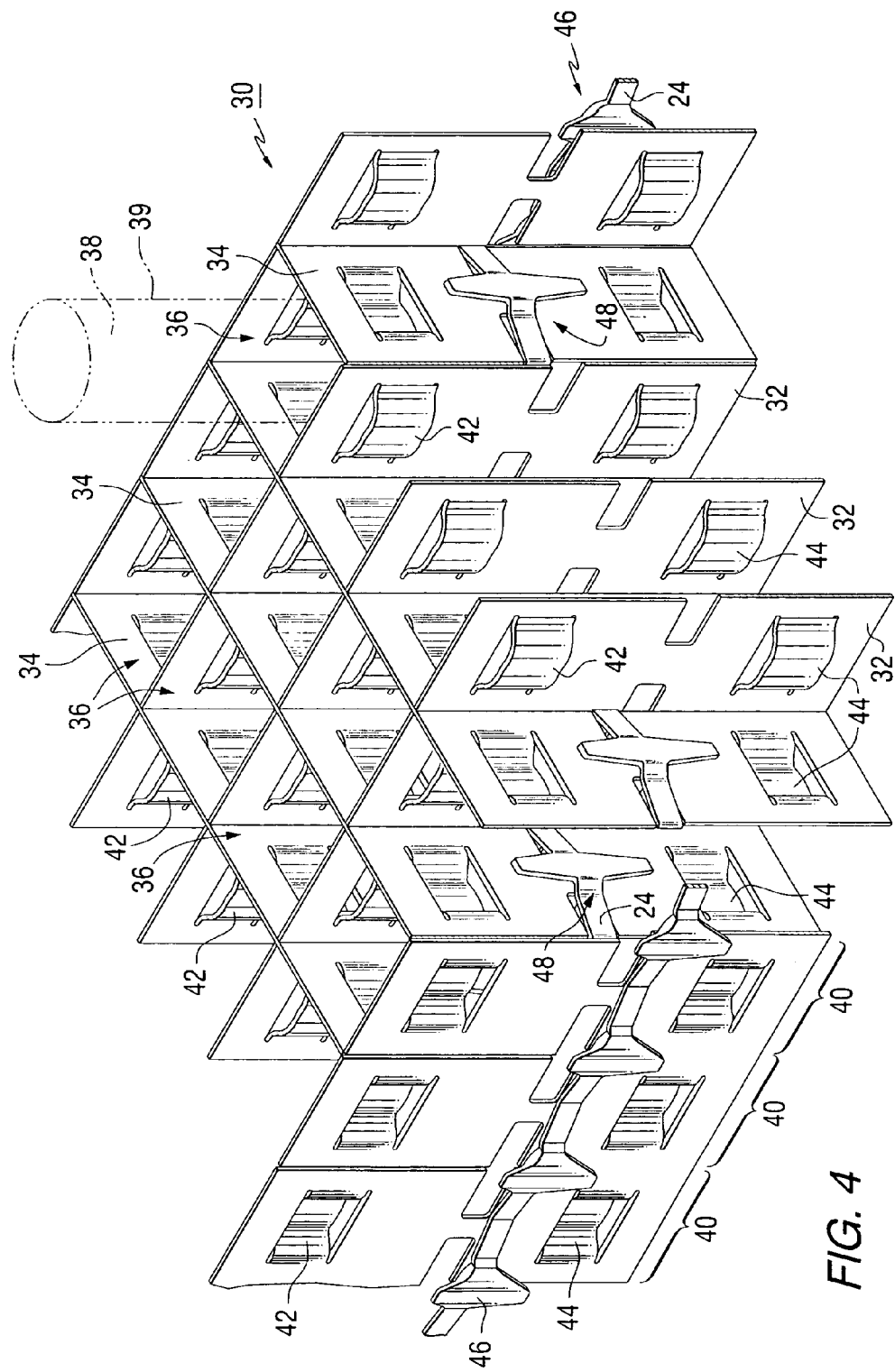
FIG. 4 is a perspective view of a portion of a spacer grid having multiple interlocking grid straps in accordance with an embodiment of the present invention.

FIG. 4 shows a perspective view of a portion of a BASG 30 in accordance with the invention. The BASG 30 comprises multiple interlocking, generally perpendicularly-spaced grid straps 32, 34 which form a number of compartments 36 within which fuel elements 38 are secured. One fuel element 38 is shown in simplified form in phantom line drawing as being secured within compartment 36 in the example of FIG. 4. The grid straps 32, 34 are made from a low growth zirconium alloy, and are substantially the same as those described previously in connection with FIGS. 1-3. Accordingly, each grid strap 32, 34 contains a series of cells 40, with each cell 40 having an upper dimple 42, a lower dimple 44, and a spring 46, 48 for engaging the cladding 39 of fuel element 38. The springs 46, 48 are made from a high growth zirconium alloy, with the features of each spring 46 being essentially identical to springs 6, described hereinabove in connection with FIGS. 1-3. The springs 46 in the example of FIG. 4 are separately formed and subsequently coupled to the grid strap 32, 34 using any known or suitable means (e.g., without limitation, interference fit, secondary forming, and welding), as described hereinabove. Accordingly, the invention provides a BASG 30 employing an optimized balance of spring and grid growth rate and design.

It will be appreciated that although the springs 46, 48 in the example of FIG. 4 are shown as being offset with respect to one another, that this is but one possible configuration in accordance with the invention. Other configurations are contemplated by the invention, for example, where all of the springs 46, 48 are disposed at the same elevation (not shown).

Whereas particular embodiments of this invention have been described above for purposes of illustration, it will be evident to those skilled in the art that numerous variations of the details of the present invention may be made without departing from the invention as defined in the appended claims.

What is claimed is:

1. A grid strap for use with a nuclear fuel assembly spacer grid having a plurality of compartments, the grid strap comprising:

a separate elongated strip member attached to the grid strap, the elongated strip member extending horizontally across the grid strap through a plurality of the compartments of the spacer grid; and a plurality of springs provided in the elongated strip member and being disposed in at least two or more of the compartments, wherein the grid strap is formed from a first zirconium alloy having a first growth rate when subjected to irradiation, wherein the separate elongated strip member and springs are made from a second zirconium alloy having a second growth rate when subjected to irradiation, and wherein the second growth rate of said second zirconium alloy is greater than the first growth rate of said first zirconium alloy.

2. The grid strap of claim 1, wherein the grid strap is annealed to reduce residual stresses.

3. The grid strap of claim 1, wherein the elongated strip member is attached to the grid strap by a method selected from the group consisting of welding, mechanical interference, and secondary forming in place.

4. The grid strap of claim 1, wherein the spring is subjected to cold work and rolling along its longitudinal axis.

5. The grid strap of claim 1, wherein the grid strap is designed to interlock with at least one other grid strap in order to form the nuclear fuel assembly spacer grid.

6. The grid strap of claim 1, wherein the grid strap includes a first end, a second end and a plurality of dimples; wherein a first dimple of the plurality of dimples is disposed proximate the first end and a second dimple is disposed proximate the second end; and wherein each of the springs is disposed between a corresponding pair of the first and second dimples.

7. A bi-alloy spacer grid for a nuclear fuel assembly having a plurality of fuel elements, the bi-alloy spacer grid comprising:
   a plurality of grid straps interlocking with respect to one another in a spaced, generally perpendicular configuration in order to form a number of compartments, each of the grid straps comprising:
      a separate elongated strip member attached to the grid strap, the elongated strip member extending horizontally across the grid strap through a plurality of the compartments of the spacer grid, and
      a plurality of springs provided in the elongated strip member and being disposed in at least two or more of the compartments,
   wherein the grid strap is formed from a first zirconium alloy having a first growth rate when subjected to irradiation,
   wherein the springs and the separate elongated strip member are formed from a second zirconium alloy having a second growth rate when subjected to irradiation,
   wherein the second growth rate of said second zirconium alloy is greater than the first growth rate of said first zirconium alloy, and
   wherein each spring is structured to engage and bias one of the nuclear fuel elements, in order that the fuel element is secured within the compartment formed by the intersecting grid straps.

8. The bi-alloy spacer grid of claim 7, wherein the grid straps are annealed to reduce most residual stresses.

9. The bi-alloy spacer grid of claim 7, wherein the elongated strip member is attached to each grid strap by a method selected from the group consisting of welding, mechanical interference, and secondary forming in place.

10. The bi-alloy spacer grid of claim 7, wherein the springs are subjected to cold work and rolling along their longitudinal axes.

11. The grid strap of claim 1, wherein each spring comprises a vertically elongated contact surface; wherein the elongated strip member includes a pair of opposing lateral protrusions extending outwardly from said vertically elongated contact surface; and wherein said lateral protrusions couple said spring to said grid strap.

12. The bi-alloy spacer grid of claim 7, wherein each of said elongated strip members is attached to and spans the lateral length of a corresponding one of said grid straps; and wherein, when said grid straps are interlocked with respect to one another, said elongated strip members are mechanically captured between adjacent interlocking grid straps.

13. The bi-alloy spacer grid of claim 12, wherein each of said elongated strip members is attached to a corresponding one of said grid straps at a different location; and wherein the elongated strip member and all of said springs of one grid strap are offset with respect to the elongated strip member and all of the springs of an adjacent grid strap.

14. The bi-alloy spacer grid of claim 7, wherein each spring comprises a vertically elongated contact surface; wherein the elongated strip member includes a pair of opposing lateral protrusions extending outwardly from said vertically elongated contact surface; and wherein said opposing lateral protrusions couple said spring to a corresponding one of said grid straps.

* * * * *